United States Patent [19]

Rodriquez

[11] Patent Number: 5,246,728

[45] Date of Patent: Sep. 21, 1993

US005246728A

[54] SCRATCH-RESISTANT COATING AND METHOD OF MAKING COATED LENSES

[75] Inventor: Jorge M. Rodriquez, Miami, Fla.

[73] Assignee: BMC Industries, Inc., Minneapolis, Minn.

[21] Appl. No.: 647,037

[22] Filed: Jan. 29, 1991

[51] Int. Cl.$^5$ .............................................. B05D 5/06
[52] U.S. Cl. .................................. 427/2; 427/164; 427/240; 427/493; 427/498; 427/508; 427/521; 427/595
[58] Field of Search ............... 427/240, 164, 2, 55, 427/54.1, 493, 498, 508, 512, 521, 595; 428/334, 521; 350/409

[56] References Cited

U.S. PATENT DOCUMENTS

| | | | |
|---|---|---|---|
| 3,968,305 | 7/1976 | Oshima et al. | 428/334 |
| 4,198,465 | 4/1980 | Moore et al. | 427/164 |
| 4,199,421 | 4/1980 | Kamada et al. | 427/164 |
| 4,274,933 | 6/1981 | Kamada et al. | 427/164 |
| 4,291,097 | 9/1981 | Kamada et al. | 427/164 |
| 4,338,269 | 7/1982 | Russell | 264/22 |
| 4,476,162 | 10/1984 | Ireland | 427/164 |
| 4,544,572 | 10/1985 | Sandvig et al. | 427/44 |
| 4,582,862 | 4/1986 | Berner et al. | 522/14 |
| 4,774,035 | 9/1988 | Carmelite et al. | 264/1.4 |

*Primary Examiner*—Janyce Bell
*Attorney, Agent, or Firm*—Kinney & Lange

[57] ABSTRACT

Plastic ophthalmic lenses are coated with a spin-coating process. A coating solution containing at least ninety percent tri- and tetra-acrylates in a butanol solvent is spin-coated onto the surface of a plastic lens. After drying, the coating is exposed to ultraviolet radiation to cure the coating. A photoinitiator is used which counteracts the tendency of oxygen to inhibit curing of the coating at its exterior surface.

37 Claims, No Drawings

SCRATCH-RESISTANT COATING AND METHOD OF MAKING COATED LENSES

BACKGROUND OF THE INVENTION

The present invention relates to scratch-resistant coatings for plastic optical elements. In particular, the present invention relates to a method of forming a scratch-resistant coating on a plastic ophthalmic lens, and the lenses formed by that process.

Plastic ophthalmic lenses have become increasing popular because of their lighter weight, reduced bulk and greater shatter resistance than glass lenses. One commonly used monomer system for forming plastic ophthalmic lenses is allyl diglycol carbonate (which is sold under the trademark CR-39).

CR-39 plastic ophthalmic lenses are relatively hard and scratch-resistant when compared to other plastic ophthalmic lenses. The scratch resistance of CR-39 lenses, however, is lower than that of glass. As a result, there has been significant effort expended to develop scratch-resistant coatings for plastic ophthalmic lenses.

A wide variety of different coating techniques and materials have been proposed over the years. These include applying coating solutions by spin, dip, spray or flow coating. In recent years, considerable effort has been expended in developing "in-mold" coating techniques, in which a coating is applied to a surface of a mold and then transferred to the lens as the lens monomer is cured in the mold.

One coating component which has been proposed by a number of different workers for scratch-resistant coating compositions is "PETA" (pentaerythritol tri- or tetra-acrylate. This component is discussed, for example, in Oshima et al. U.S. Pat. No. 3,968,305, Russell U.S. Pat. No. 4,338,269, Sandvig et al U.S. Pat. No. 4,544,572 and Carmelite et al U.S. Pat. No. 4,774,035.

SUMMARY OF THE INVENTION

The present invention is a method of coating a surface of a plastic lens by applying a coating solution which incudes PETA, a viscosity reducing agent, a wetting agent, a photoinitiator, and a solvent. The coating on the lens is then cured by exposing the coating to ultraviolet (UV) radiation. The photoinitiator has an absorption characteristic which maximizes the extent of ultraviolet curing at the exterior surface in order to counteract the effect of oxygen inhibition at the air/coating interface.

In preferred embodiments of the invention, the coating solution is applied by spin coating. The lens is rotated during a washing step which precedes the applying of the coating solution, during and after the applying of the coating solution, and during a drying step which follows the applying of the coating solution and precedes exposing the coating to UV radiation.

The coating solution preferably contains between about 10% and 35% solids. The PETA contains at least 90% acrylates of at least triacrylate functionality.

The preferred coating solution contains butanol as a solvent. Butanol has been found to allow a more uniform distribution of the coating during spin coating. Evaporation differences between different areas of the lens are minimized when butanol is employed as a solvent.

A preferred photoinitiator which maximizes ultraviolet cure at the exterior surface of the coating is 2-methyl-1-[4-(methyithio)phenyl]-2 morpholinopropanone-1, which is sold as Irgacure 907 by Ciby-Geigy Corporation. In some embodiments, more than one photoinitiator is used, such as a combination of Irgacure 907 and Irgacure 184.

Lenses coated with the coating solution of the present invention have been found to exhibit high levels of scratch resistance, good adhesion of the coating to the lens, and acceptable optical and cosmetic properties for single vision lenses, bifocals and trifocals.

DETAILED DESCRIPTION OF THE PREFERRED EMBODIMENTS

The coating process of the present invention is a spin coating process which is capable of coating large numbers of plastic CR 39 lenses on a production line basis. The process is a spin coating process, which makes use of a coating solution containing between about 10% and about 35% solids (more preferably between about 12% and about 20% by weight solids) with the primary solids constituent being PETA. Most commercially available versions of PETA contain varying amounts of pentaerythritol tri-acrylate and pentaerythritol tetra-acrylate. Other acrylate functionalities are also present in varying amounts. In the present invention, the PETA preferably contains at least about 90% acrylates of tri-acrylate functionality or greater. In other words, the amount of diacrylates contained in the coating formulations of the present invention is minimized. In preferred embodiments of the present invention, the PETA constituent is preferably Sartomer 295, Sartomer 444 or Radcure Specialties PETA.

In addition to the PETA component, the coating solution of the present invention also preferably includes a viscosity reducing agent such as polyethylene glycol diacrylate sold as Sartomer SR 344 by Sartomer Corporation, a wetting agent (or surfactant) such as FC 430 by 3M Company, a UV tracer solution (which is used for identification purposes) such as Uvitex OB by 3M Company in 1% solution with methylene chloride, a photoinitiator such as Irgacure 907 or blends containing Irgacure 907, and a solvent. Irgacure 907 is 2-methyl-1-[4-(methyithio)phenyl]-2 morpholinopro-panone-1, and is described further in U.S. Pat. No. 4,582,862. Butanol is the preferred solvent, although other solvents such as methanol and isopropanol have been used. Butanol has been found particularly useful because it allows the coating solution to be uniformly distributed without effects of evaporation differences.

PETA has been considered and used by various investigators in making scratch resistant coatings for lenses and other plastic articles. For example, PETA is a major component of the in-mold coating solution described in the Carmelite et al U.S. Pat. No. 4,774,035.

One disadvantage of PETA when it is applied to an already fabricated lens is that the exterior surface of the coating will be exposed to oxygen during curing, unless special steps are taken to create an oxygen-free environment. As a result, a PETA-based coating, if cured in air, will exhibit lower scratch resistance than what otherwise would be expected because the coating at the air/coating interface is less cured than the remainder of the coating.

With the present invention, a photoinitiator is used which counteracts the effects of air inhibition. In particular, it has been found that 2-methyl-1-[4-(methyithio)phenyl]-2 morpholinopro-panone-1 (sold as Irgacure 907) is a photoinitiator which maximizes the extent of UV initiated cure at the exterior surface of the coating. Irgacure 907 has absorption coefficients which match closely the emission spectra of the UV lamp (which is preferably a Fusion Systems Type H, 10-inch bulb). In addition, the coefficient of extinction of Irgacure 907 is very high. As a result, free radical generation is high, and the effect of oxygen inhibition is negated or minimized to an extent that scratch resistance is not compromised. By using a photoinitiator entirely of Irgacure 907, or of a mixture of Irgacure 907 with another photoinitiator (such as Irgacure 184) high levels of scratch resistance have been obtained, even though the coatings are cured by UV radiation in the presence of air.

The spin coating process used in the present invention begins after the cast CR-39 lenses are removed from their molds. The gasket which holds the mold faces and the lens together is removed, and the lenses, with the glass mold on opposite sides, are placed in an oven at an elevated temperature. When the lens is separated from the two glass lens molds, the process is performed under a stream of de-staticized air. It is important that dust and other particles do not settle on the surface of the plastic lens, since that would result in particles being trapped between the lens surface and the coating which is being deposited.

The lens is mounted on a fixture, and the lens drive motor spins up to a preset wash speed. An arm which carries a brush and a wash fluid nozzle is positioned near the center of the spinning lens. A cleaning fluid is supplied for about 1 to 8 seconds through the brush onto the surface of the lens, as well as from a separate nozzle. The wash arm is retracted, and the lens is then spun for about 5 seconds at a second, higher speed to spin off the wash fluid. In the preferred embodiment, the wash fluid is preferably isopropyl alcohol. The wash speed is preferably about 2000 to 2500 r.p.m., and the wash spin off speed is about 3000 r.p.m. The flow rate for washing solution is about 500 to about 1000 cc/min.

In some embodiments of the present invention, the wash cycle is followed by an infrared drying cycle in which a drying arm carrying an infrared heater is extended to position opposite the spinning lens, and the spinning lens is spun at a speed of about 500 r.p.m. At the end of the cycle, the drying arm is retracted and the lens is allowed to spin down to zero.

After the wash cycle, or after the optional infrared drying cycle, the coating cycle begins. A coating arm, which carries a nozzle for supplying coating solution to the surface of the lens is extended into position, and the lens is spun up to a coating speed. The coating arm extends slightly beyond center of the lens, and then begins to retract while fluid is supplied through a nozzle. After the coating arm is retracted, the lens continues to spin at a coat spin off speed for a period of time, and then is allowed to spin down to zero.

In a preferred embodiment of the present invention, the coat speed is between about 500 r.p.m. and about 1800 r.p.m., and more preferably between about 700 r.p.m. and about 1200 r.p.m. Coating solution is applied for about 3 to 6 seconds. The coat spin off speed is preferably about 500 to 1800 r.p.m , and the coat spin off time is about 1.5 to 30 seconds.

The flow rate for the coating solution is preferably between about 40 and about 250 cc/min at a pressure of about 2.25 to 3.0 psi. In a preferred embodiment, the nozzle which supplies coating solution has an orifice of about 1/8 inch, and the nozzle extends about 1 inch past center of the lens when the coating arm is in its fully extended position.

After the coating cycle has been completed, an infrared drying cycle for the coating occurs next. The drying arm is fully extended, and the lens is spun up to a speed of about 400 to 1000 r.p.m. The dry arm remains in position for about 5 to 12 seconds. The dry arm is then retracted and the lens is permitted to spin down to zero.

At this point, the lens has been coated and dried, and the next step is ultraviolet exposure. The UV exposure occurs in the presence of air, and must be sufficient to provide a desired level of curing at the outer surface of the coating. UV exposure levels of between about 5300 mJ/cm$^2$ and 19000 mJ/cm$^2$ are used in preferred embodiments of the present invention.

With the present invention, a family of coating solutions have been developed which are capable of being applied to CR-39 plastic lenses, and which will exhibit high scratch resistance, good adhesion and acceptable optical and cosmetic characteristics when compared to other commercially available coatings. In general, the particular coating solution formula which is selected depends upon the type of lens being coated, and the scratch resistance required. For single vision and bifocal lenses, extremely high scratch resistance is achieved. On trifocals, the same coating solutions used for single vision and bifocal lenses have a tendency to leave "tails" at the trifocal seg lines. As a result, slightly different formulations—having the same general components but differing levels of solids—provide acceptable (though slightly lower) scratch resistance and acceptable cosmetics for even hard-to-coat trifocal lenses.

When compared to an in-mold coating process such as the process described in the Carmelite et al U.S. Pat. No. 4,774,035, the spin coating process of the present invention offers improved scratch resistance and improved adhesion. In addition, the process of the present invention results in higher yields. In-mold coating processes add additional causes for failure, and therefore exhibit lower yields than uncoated CR-39 lenses. The present invention, on the other hand, exhibits slightly higher yields than are experienced with uncoated CR-39 lenses. The apparent reason for this improved yield is that some lenses which would fail inspection tests if left uncoated, have surface defects which are covered over by the coating of the present invention.

In a production setting, in which thousands or millions of lenses are being manufactured and coated, even a slight increase in yield can have significant economic impact.

The following set of examples describe tests performed on coating solutions of the present invention. In evaluating lenses coated in these examples, adhesion, scratch resistance, and optical quality testing were performed. The adhesion test is a cross-hatch tape test.

The scratch resistance test used in the various examples makes use of 000 steel wool which is rubbed over the surface of the coated lens while applying light finger pressure. The lens is then inspected, and the number of scratches on the lens are counted. The total number of scratches for a sample of 10 lenses is determined, and that is a number which gives a relative measure of scratch resistance. In general, the lower the scratch resistance number, the higher the relative scratch resistance of the coating. For comparative purposes, the in-mold coated lenses made by the assignee of the present invention using the process described in the Carmelite et al U.S. Pat. No. 4,774,035 typically have a scratch resistance value of between about 18 and 28. The specification for maximum acceptable scratch resistance value for the in-mold coated lenses made using the Carmelite et al process is 40.

The optical tests are visual inspections which are the same as are used by the assignee of the present application for judging production quality coated lenses and uncoated lenses.

EXAMPLE 1

A coating composition having the following ingredients was prepared:

TABLE I

| | Composition A | |
|---|---|---|
| | Grams | Solids Ratio |
| Sartomer - 444 | 3,133 | .776 |
| Sartomer - 344 | 351 | .087 |
| Irgacure - 907 | 262 | .065 |
| U.V. Tracer Solution | 210 | .026 |
| FC-430 Solution | 182 | .045 |
| Butanol | 7,500 | |
| Total Wt: | 11,533 g. | |
| % Solids: | 35% | |

Ten D-style bifocal CR-39 lenses were coated using the following sequence:

First, the lenses were washed with isopropyl alcohol. The lenses were spun to a wash speed of 2,000 r.p.m. At the start of spin up and the starting of the extension of the wash arm, there was a 0.5 second delay before the wash fluid was turned on. The flow rate of the wash fluid was 600 cc/min. Once the wash arm had fully extended, it stayed in position for 0.1 seconds before beginning retraction. From the start of retraction until the fluid is turned off was about 1 second. The wash spin off speed was 3,000 r.p.m. and the wash spin off time was 5 seconds.

The wash cycle was followed by a first infrared drying cycle. The infrared heater caused the surface temperature of the lens to be about 50°-55° C. The lens was rotated at 1500 r.p.m. The drying time was about 10 seconds.

The coating cycle was performed with a speed of about 1,000 r.p.m., both during the coating and the spin off time period. In this particular example, the lenses were coated by supplying the coating solution through a syringe, rather than an automatic coating arm.

Following the spin off of the coating (which took about 5 seconds) the infrared drying cycle took place. The temperature at the surface again was about 50°-55° C. The spinning speed was about 400 r.p.m. and the drying time was about 12 seconds.

The coated lenses were exposed to ultraviolet radiation at two different levels. Five of the lenses were exposed for 15 seconds to ultraviolet radiation at a dose rate of about 883 mJ/cm$^2$/sec. The other five lenses were exposed to the same ultraviolet radiation but for 20 seconds.

Scratch resistance tests were performed on each of the five lenses. The five lenses which had been exposed for 15 seconds had three lenses with zero scratches and two lenses with 1 scratch. In other words, for a total of five lenses, there were 2 scratches. Normalizing this number to a sample of ten lenses, the scratch resistance value is 4.

The lenses exposed for 20 seconds exhibited slightly lower, but still excellent, scratch resistance. One lens had zero scratches, and the other four lenses had 1 scratch each. That resulted in a total of 4 scratches for five lenses, or a scratch resistance value of 8.

EXAMPLE 2

Eleven lenses were coated using the Composition A of Example 1. The process parameters were the same as in Example 1, except that the infrared drying times were 5 seconds, the UV exposure was 18 seconds, and the coating was applied by the coating arm, rather than by a syringe.

The coating cycle was performed with a spin coat speed of 1,000 r.p.m. The delay between the beginning of the retracting of the coating arm and fluid flow from the nozzle was 0.8 seconds. The fluid was on for 6 seconds, and the flow rate was about 160 cc/minute. The flow was maintained with a regulated pressure of 3 psi.

Seven of the eleven lenses (approximately 65 percent) were good according to visual inspection. Four of the lenses had particles on the surface which appeared to be trapped between the coating and the lenses.

The scratch resistance test results were excellent. A scratch resistance value of 5 was obtained.

No adhesion tests were performed because the tests had shown that cleanliness of the lens surface prior to coating needed to be studied.

EXAMPLE 3

Five lenses were run using the coating Solution A of Example 1. The process parameters were the same as described in Example 2, except that the spin speed during wash was increased to 2500 r.p.m., and each lens was given three wash cycles before coating. The delay time between the beginning of retracting and the running off of the wash fluid was also extended to 1.7 seconds to make sure that fluid was turned off just after leaving the edge of the lens.

Four of the five lenses obtained were found to be of highest optical quality. The remaining lens was judged to be of lesser quality because of two small particle defects found during inspection.

One of the challenges in developing a spin coated plastic ophthalmic lens is the coating of bifocal and trifocal lenses which have an abrupt seg line between regions of different optical power. During the spin coating process, "seg tails" which are small areas of coating buildup which do not conform to the underlying lens can occur at the edges of the seg lines.

EXAMPLE 4

In order to study the effects of formulas and process parameters on the visibility of seg tails, a series of tests were performed.

Three basic approaches were used in these tests. First, the intrinsic viscosity of the formula was varied by reducing the amount of solids in 5 percent increments. Second, the coating speed and the spin off speed during the coating cycle were varied. Third, the flow rate of the coating solution was varied.

The following formulas (Compositions B-E) were prepared:

TABLE II

| Compositions | B Grams | C Grams | D Grams | E Grams |
|---|---|---|---|---|
| Sartomer - 444 | 332.0 | 258.4 | 194.0 | 136.6 |
| Sartomer - 344 | 37.2 | 28.9 | 21.8 | 15.3 |
| Irgacure - 907 | 27.8 | 21.6 | 16.3 | 11.4 |

TABLE II-continued

| Compositions | B Grams | C Grams | D Grams | E Grams |
| --- | --- | --- | --- | --- |
| FC-430 Solution | 19.3 | 15.0 | 11.3 | 7.9 |
| UV Tracer Solution | 11.0 | 8.7 | 6.5 | 4.5 |
| Butanol | 1000.0 | 1000.0 | 1000.0 | 1000.0 |
| % Solids | 30% | 25% | 20% | 15% |

The lenses which were coated were at a temperature close to room temperature. All of the lenses were either trifocal 75 mm or bifocal 75 mm CR-9 lenses.

Except as described in Tests 10 and 11 in TABLE III, the flow rate used during coating was 55-65 cc/minute. All of the lenses were exposed to a UV exposure of 883.3 mJ/cm$^2$/sec for a total of 6 seconds. In other words, the total UV exposure was 5300 mJ/cm$^2$.

TABLE III describes the results of Tests 1-11, which used Compositions B, C, and D and which used various combinations of other parameters such as coating speed, spin-off speed, spin-off time, and flow rate.

TABLE III

| Test No. | % Solids | Coat Speed-rpm | Spin-Off Speed-rpm | Spin-Off Time | Flow Rate cc/min | Seg Tails |
| --- | --- | --- | --- | --- | --- | --- |
| 1 | 30 | 1,000 | 1,000 | 5 sec. | | Yes |
| 2 | 30 | 1,000 | 1,500 | 5 sec. | | Yes |
| 3 | 30 | 1,200 | 1,500 | 5 sec. | | One side only |
| 4 | 30 | 1,500 | 1,500 | 5 sec. | | One side only-probably acceptable |
| 5 | 25 | 1,500 | 1,500 | 5 sec. | | No tails visible |
| 6 | 25 | 1,000 | 1,000 | 5 sec. | | Slight tails on right side of seg (right lens) |
| 7 | 25 | 1,000 | 1,500 | 5 sec. | | Slight tails on left side of seg (left lens) |
| 8 | 25 | 1,200 | 1,500 | 5 sec. | | No tails visible on small tri-focal. Barely visible on the large tri-focal seg. |
| 9 | 25 | 1,200 | 1,500 | 5 sec. | 210-225 | Faint tails visible on both sides. Probably acceptable |
| 10 | 20 | 1,200 | 1,500 | 5 sec. | 210-225 | Not visible in some lenses. Barely visible on one side of the seg only on some. Probably acceptable |
| 11 | 25 | 1,200 | 1,500 | 5 sec. | 150 | Tails almost imperceptible in most lenses. |

Scratch resistance tests were performed on the lenses of Tests 8, 9, 10, and 11. The lenses of Test 8 had a scratch resistance value of 51. The lenses of Test 9 had a scratch resistance value of 10. The lenses of Test 10 had a scratch resistance value of 37. The lenses of Test 11 had a scratch resistance value of 10.

EXAMPLE 5

A solution of a Composition C from Example 4 was mixed and tested by coating approximately 40 lenses. The lenses were kept in an oven and had a lens surface temperature of 145° F. to 155° F.

During the wash cycle, the wash speed was 2500 r.p.m. The washing fluid used was isopropyl alcohol with a wash fluid pressure of 6.25 psi. The delay between the time when the wash arm began to extend and fluid turned on was 0.5 seconds. The delay between extending and fluid off was 1.7 seconds. A spin off speed of 3000 r.p.m. was used for a spin off time of 5 seconds.

There was no infrared drying cycle following the wash cycle. Instead, the coating cycle immediately followed the wash cycle.

During the coating cycle, the spinning speed was 1200 r.p.m. during both coating and spin off. The coating flow rate was 150 cc/min, with a pressure of 2.25 psi. The delay between retract and turning on of the coating fluid was 0.8 seconds. The delay between fluid on and fluid off was 4 seconds. The spin off time was 5 seconds.

An infrared drying cycle followed the coating cycle. The spinning speed during the infrared drying was 1000 r.p.m. The drying time was 6 seconds, and the surface temperature of the coated lenses was about 125° F. to about 140° F.

Approximately 40 assorted D-style lenses were coated and then subjected to adhesion, scratch resistance, and dye defects testing.

The adhesion testing showed excellent adhesion using a cross-hatch tape test with the lenses dry, with the lenses after drying, and after bleaching.

The scratch resistance testing yielded a scratch resistance value of 25.

The dye defects test revealed one lens with a heavy dot and one lens with a light amount of peeling at the seg line. All of the trifocal lenses had a slightly ragged pattern immediately below the bottom ledge of the trifocal. The bifocal lenses did not show this same pattern, with the exception of one lens. Seg tails were found to be of an acceptable nature. The pattern under the bottom ledge of the trifocal lenses and the seg tails were of a minor nature, which would not affect the acceptability of the lenses for commercial purposes.

EXAMPLE 6

Tests were performed to determine a relationship between percent solids, flow rate, and coating speed. The coating solutions used were similar to Compositions B-E. One solution which was used contained 20 percent solids (similar to Composition D of Example 4) and the other solution contained 16 percent solids.

Test 10A was similar to Test 10 of Example 4, except that a fresh solution according to the formula of Composition D was made, and the flow rate for the coating solution was 240-260 cc/min.

Test 12 was similar to the conditions of test 10, but used the same solution as Test 10A. The flow rate for the coating solution was 110–120 cc/min.

Test 13 used similar conditions to Test 10, except that a solution with 16.1 percent solids was used and a flow rate of 240–260 cc/min was used.

Test 14 was similar to Test 13, except that a speed of 1000 r.p.m. was used during coating and coating spin off.

Five lenses made with each of these tests were subjected to scratch resistance testing. Results were as follows:

In Test 10A, the scratch resistance value was 50. In Test 12, the scratch resistance value was 46. In Test 13, the scratch resistance value was greater than 80. In Test 14, the scratch resistance value was 54.

All of the lenses were exposed for 18 seconds to ultraviolet radiation at a rate of 5800 mJ/cm$^2$/6 sec.

All of the lenses made with this Example were found acceptable from a cosmetic standpoint. No cosmetic defects were found, and the seg definition was acceptable.

EXAMPLE 7

In this Example, Composition A from Example 1 was coated on single vision and progressive multifocal lenses. The formula was mixed and filtered through a 0.6 micron filter cartridge. The coating parameters were as follows:

During the wash sequence, the wash speed was 2500 r.p.m. and the spin off speed was 3000 r.p.m. The spin off time was 5 seconds.

The delay between arm extend and brush down was 1 second. The delay between extend and brush up was 4 seconds. The delay between extend and fluid on was 0.5 seconds, and the delay between arm retract and fluid off was 1.7 seconds.

The coating sequence immediately followed the wash sequence, with no intermediate infrared drying sequence. The coating speed and the spin off speed were both 1200 r.p.m. The delay between retract and fluid on was 0.5 seconds, and the delay between fluid on and fluid off was 4 seconds. The spin off time was 5 seconds.

During the infrared drying sequence which followed coating, the speed was 1200 r.p.m. The drying time was 6 seconds.

Twenty single-vision lenses and five progressive lenses were coated using these conditions. Different levels of UV exposure were used. The exposure time was varied, with an exposure dose of 950 mJ/cm$^2$/sec.

The results of the scratch resistance testing on these lenses were as follows:

TABLE IV

| # of Lenses | Type | Exposure | Scratch Resistance # |
|---|---|---|---|
| 5 | single-vision | 10 sec | 5 |
| 5 | single-vision | 12 sec | 10 |
| 5 | single-vision | 15 sec | 10 |
| 5 | single-vision | 20 sec | 17 |
| 5 | progressive | 15 sec | 10 |

EXAMPLE 8

Fifteen assorted 8×35, trifocal, and bifocal lenses were coated with a solution of the 20 percent solids composition (Formula D). The solution was made the same day that the lenses were coated, and was filtered through a 0.45 micron filter. The coating parameters were as follows:

The wash fluid was isopropyl alcohol. The flow rate of the wash fluid was 900 cc/min, and the pressure was 4.75 psi.

The coating solution flow rate was 180 to 200 cc/min. The pressure of the coating solution was 2.75 psi.

During the wash cycle, the wash speed was 2500 r.p.m. The spin off speed was 3000 r.p.m. for a period of 5 seconds.

The coating cycle immediately followed the wash sequence, without an intermediate infrared drying sequence. The coating speed was 1200 r.p.m. The spin off speed was 1200 r.p.m. for a period of 5 seconds. The flow time when coating solution was being applied to the lens surface was 4 seconds.

The drying cycle followed the coating sequence. Infrared radiation was applied to the lens and coating for a period of 6 seconds while the lenses were rotated at 1000 r.p.m.

The UV exposure was for 10 seconds at a rate of (950 mJ/cm$^2$)/sec.

A scratch resistance test was performed on five of the lenses. The scratch resistance number obtained was 56.

Visual inspections were performed of the seg line areas of the lenses. The visual inspection revealed only very slight visible seg tails in some lenses. The seg tails in every case were of a nature which would not detract from the overall appearance and usefulness of the lens.

EXAMPLE 9

A coating solution of Composition of D was prepared, with Radcure Specialties PETA substituted for Sartomer 444. The Radcure Specialties PETA contained about 1 percent diacrylates, 35 percent triacrylates and 47 percent tetracrylates.

All lenses which were coated were CR-39 lenses D-35-75mm 4, 6 base.

The coating parameters were the same as used in Example 8, with the following exceptions:

The coating flow rate was 250–300 cc/min. The UV exposure was varied between 8, 10, and 15 seconds. The UV energy was 1100 mJ/cm$^2$/sec.

Four lenses from each UV exposure level were subjected to scratch resistance testing. The lenses with 8 second exposure had a scratch resistance number of 2.5. The lenses with 10 second exposure had a scratch resistance number of 5. The lenses with a 15 second exposure had a scratch resistance number of 12.5.

Nine lenses were subjected to adhesion tests. All of the lenses exhibited acceptable adhesion dry, after 30 minutes in dye, and after 15 minutes in bleach.

All of the lenses inspected passed the dye defects test.

EXAMPLE 10

A coating solution having the general formula shown in Composition D of Example 4 was prepared, with Sartomer 295 replacing Sartomer 444 in the formula. Twenty lenses were coated after being heated to 160° F. in an oven. All of the lenses coated were 6 base, either 8×35, 70/75 mm, or D-35-70 or 75 mm.

The coating parameters were the same as in Exhibit 8, except that the coating flow rate was 285–300 cc/min at 3.0 psi, and UV exposures of 8, 10 and 15 seconds at 1100 mJ/cm$^2$/sec were used.

Five lenses made with each of the three different UV exposures were subjected to scratch resistance testing. The 8 second exposure lenses had a scratch resistance number of 6. The lenses exposed for 10 seconds had a scratch resistance number of 12. The lenses which were exposed for 15 seconds had a scratch resistance number of 18.

Adhesion tests were performed on seven lenses, and acceptable adhesion was achieved dry, after 30 minutes in dye at 190° F., and after 15 minutes at 212° F. in bleach.

Seg tails were not visible at all in the upper ledge. Almost imperceptible tail shoulders were visible on the bottom ledge, and only if oriented properly during inspection under UV radiation.

No dye defects were found in the lenses which were tested.

EXAMPLE 11

In order to evaluate the aging properties of the coating solution of Example 10, ten D-35 lenses were coated with a solution of Example 10 which had been mixed the prior day. The same coating parameters as Example 10 were used, with 8 second UV exposure.

The coating solution had been mixed at approximately 8:30 a.m. on one morning, and the study of this Example was conducted about 4:30 p.m. on the following day.

The lenses which were coated exhibited acceptable adhesion and a scratch resistance number of 9. Seg tails were slightly visible on the corner of the seg line on some of the lenses.

EXAMPLE 12

The following coating composition was prepared:

TABLE V

| Composition F | Grams |
| --- | --- |
| Radcure PETA | 821.0 |
| Sartomer - 344 | 92.0 |
| Irgacure - 907 | 68.7 |
| UV Tracer Solution | 27.5 |
| FC-430 Solution | 47.6 |
| Butanol | 6,000.0 |
| Total: | 7,056.8 |
| % Solids: | ~13% |

8×35 and D-35 lenses were coated with Composition F using a coating flow rate of 285–300 cc/min at 2.75–2.85 psi. The coating speed was 1200 r.p.m., with a 1200 r.p.m. spin off. Infrared drying following the coating cycle was for 6 seconds at 1200 r.p.m. The lenses were exposed for 8 seconds at $(1,119 \text{ mJ/cm}^2)/\text{sec}$.

The coated lenses were subjected to scratch resistance and visual inspection testing. The scratch resistance value was 15.

The lenses were inspected for seg tails. An 8×35,6 base lens showed no tails at the top ledge, and a faint tail primarily on one side of the bottom ledge.

An 8×35,4 base lens showed no tails on the top ledge. Very faint tails were seen on one corner of a bottom ledge. A very faint shoulder tail was found on the opposite corner.

An 8×35,8 base lens showed seg tail configurations similar to the 4 base lens discussed above.

A D-35,6 base lens showed no tails.

A D-35,10 base lens showed faint partial shoulder tails out of both seg corners.

EXAMPLE 13

Experiments were run to determine if variation in spin off speed after coating improves the appearance of seg tails. D-35,6 base-75 mm lenses were coated with Composition F which was two days old. The spin off speed was varied and the lenses were compared to each other for seg tail quality. TABLE VI shows the results.

TABLE VI

| Control | Relative Rating of SEG Tails Quality |
| --- | --- |
| 1200 rpm coating, 1200 rpm spin-off | Standard |
| Test A 1200 rpm coating, no spin-off | Worst |
| Test B 1200 rpm coating, 1400 rpm spin-off | Better |
| Test C 1200 rpm coating, 1600 rpm spin-off | Worse than Test B |
| Test D 1200 rpm coating, 1800 rpm spin-off | Best |
| Test E 1200 rpm coating, 2000 rpm spin-off | Equal to Test C |

Tests A, D and E were repeated to confirm the original results. The results were the same when repeated.

EXAMPLE 14

The following composition was prepared:

TABLE VII

| Composition G | | |
| --- | --- | --- |
|  | Grams | Solids Ratio |
| Radcure PETA | 794.0 | 0.776 |
| Sartomer - 344 | 90.0 | 0.087 |
| Irgacure - 907 | 66.5 | 0.065 |
| FC-430 Solution | 46.0 | 0.045 |
| UV Tracer Solution | 26.6 | 0.026 |
| Butanol | 7,500.0 | |
| Total: | 8,523.1 | |
| % Solids: | ~12% | |

Twelve 8×35 trifocal lenses were placed in an air oven at 160° F. overnight, along with five single-vision lenses. The lenses were coated with Composition G, which had been prepared the afternoon of the prior day. The solution was not prefiltered prior to use.

The coating speed was varied to determine the effect on seg tails. The results and coating parameters are described in TABLE VIII.

TABLE VIII

| Amount of Lenses | Coating Speed-rpm | Spin-Off Speed-rpm | Coating Flow cc/min | UV Exposure | Seg Tails |
| --- | --- | --- | --- | --- | --- |
| 3 | 700 | 1200 | 285–300 | 7 sec @ 1100 mJ/cm²/sec | Not visible |
| 3 | 800 | 1200 | 285–300 | 7 sec @ 1100 mJ/cm²/sec | Not visible |
| 3 | 900 | 1200 | 285–300 | 7 sec @ 1100 mJ/cm²/sec | Not visible |
| 3 | 1000 | 1200 | 285–300 | 7 sec @ 1100 mJ/cm²/sec | Slight tail on one corner of the bottom ledge |

Five single-vision lenses were also coated at 800 r.p.m., with the other coating parameters being the same as shown in the table. These lenses were subjected to scratch resistance testing. The scratch resistance value obtained was 35.

EXAMPLE 15

In an attempt to reduce the apparent yellowness of the coating, a blend of two photoinitiators, Irgacure 907 and Irgacure 184, was used. The following composition was prepared:

TABLE IX

| Composition H | Grams |
| --- | --- |
| Radcure PETA | 1278 |
| Sartomer - 344 | 143 |
| Irgacure - 907 | 53.5 |
| Irgacure - 184 | 53.5 |
| UV Tracer Solution | 42.8 |
| FC-430 Solution | 74.0 |
| Butanol | 7500.0 |
| Total: | 9144.8 |
| % Solids: | ~18% |

Lenses were coated using a coating flow rate of 285-300 cc/min, a coating spin speed of 800 r.p.m., and a UV exposure which varied from 7 seconds to 12 seconds.

The lenses which were prepared appeared to be slightly less yellow. The scratch resistance test yielded a scratch resistance number of 8.

EXAMPLE 16

The experiments of Example 15 were repeated in an attempt to establish the relationship, if any, between UV exposure and scratch resistance.

A coating solution of Formula H was mixed, and several lenses were coated. The coating flow rate was 285-300 cc/min. The speed during coating and spin off was 1200 r.p.m., and the UV energy was (1,031 mJ/cm$^2$)/sec. UV exposures of 5, 8 and 12 seconds were used.

The lenses using a 5 second exposure had a scratch resistance value of 10. The lenses using 8 and 12 second exposures had scratch resistance values of 6.

Using a UV spectrophotometer, tests were performed to determine levels of yellowness for lenses made using the process of the Carmelite patent, lenses using Composition H, and with a composition similar to Composition H, except that Irgacure 184 was not used and twice the amount of Irgacure 907 was used.

With these tests, the coatings formed using the in-mold coating process of the Carmelite patent had a yellowness index of 3.33. The lenses coated by spin coating with a composition having only Irgacure 907 as a photoinitiator and 18 percent solids had a yellowness index of 1.17. Lenses coated with Composition H had a yellowness index of 0.88. The higher the index, the yellower the lens. It can be seen, therefore, that the spin coated lenses of the present invention had coatings which were actually substantially less yellow than the standard in-mold coated lenses using the Carmelite et al process.

EXAMPLE 17

A coating composition of the following formula was prepared:

TABLE X

| Composition I | Grams |
| --- | --- |
| Sartomer - 444 | 1455.0 |
| Sartomer - 344 | 163.5 |
| Irgacure - 907 | 61.0 |
| Irgacure - 184 | 61.0 |
| UV Tracer Solution | 48.8 |
| FC-430 Solution | 84.7 |
| Butanol | 7500.0 |
| Total: | 9374.3 |
| % Solids: | ~20% |

Twenty-four bifocal and trifocal lenses were coated using the following parameters:

During the wash cycle, the spin wash speed was 2500 r.p.m. and the spin cycle time in which fluid was on was 7.3 seconds. Fluid flow rate was 900 cc/min. The spin off speed was 3000 r.p.m., with a spin off time of 5 seconds.

There was no intermediate infrared heating cycle. The coating cycle was performed using a spin coating and spin off speed of 1200 r.p.m. The spin coating time was 3.0 seconds, in which fluid was being applied to the surface of the lens. The fluid flow rate was 330 cc/min. The spin off time period was 5 seconds.

The infrared drying cycle which followed the coating cycle used a drying speed of 1200 r.p.m. and a drying time of 6 seconds. The temperature at the surface of the base was 169° F.

The lenses were exposed to ultraviolet radiation of (1122.9 mJ/cm$^2$)/sec for a period of 8 seconds.

All of the lenses tested passed adhesion tests dry, wet and bleach. None of the lenses showed dye defects. The scratch resistance value obtained was 21.

EXAMPLE 18

A composition similar to Composition D, with Sartomer 295 replacing Sartomer 444 and with the photoinitiator being half Irgacure 907 and half Irgacure 184, was prepared. The same coating parameters used in Example 17 were used to coat twenty-four lenses. The lenses had been obtained at random from the production line and were heated in an oven at about 160° F. The lenses were coated one at a time, using the coating parameters of Example 17.

The coated lenses were then inspected by production line inspectors using the same quality standards used for other coated and uncoated lenses. Of the twenty-four lenses, two were rejected due to lint and surface stains. The other twenty-two lenses were found acceptable. This equates to a 91.6 percent yield.

The lenses were then subjected to adhesion, dye and scratch resistance tests. All lenses passed adhesion tests under dry, wet dye, and bleach testing conditions. All of the lenses passed the dye test. The scratch resistance value obtained was 7.

CONCLUSION

With the spin coating process of the present invention, high yields of optically and cosmetically acceptable coated lenses can be obtained. Scratch resistance which is even higher than possible with an in-mold coating process of the type described in the Carmelite et al patent have been obtained.

The present invention uses a family of coating compositions which allows selection of desired scratch resistance levels, depending on other considerations, such as whether the lens to be coated is single-vision, bifocal, or trifocal. By reducing the solids level (for example, to about 12 percent), high quality coatings on trifocal lenses have been obtained using spin coating. This is a significant improvement over prior art processes in which the coating is applied after the lens has been formed.

Although the present invention has been described with reference to preferred embodiments, workers skilled in the art will recognize that changes may be made in form and detail without departing from the spirit and scope of the invention.

What is claimed is:

1. A method of coating a front surface of a plastic ophthalmic lens comprising:
   spinning the lens;
   washing the front surface of the lens while spinning the lens;
   applying by spin coating, to the front surface of the lens while the lens is spinning, a coating of a solution which includes:
   pentaerythritol-based acrylates having at least triacrylate functionality,
   a viscosity reducing agent which contains acrylates of less than triacrylate functionality,
   a wetting agent,
   a photoinitiator having a UV response which tends to counteract oxygen inhibition of curing at an outer surface of the coating, and a solvent; and
   exposing the coating to UV radiation in the presence of air to cure the coating so that the coating is essentially fully cured at its outer surface.

2. The method of claim 1 wherein the solution contains between about 10% and about 35% by weight solids.

3. The method of claim 2 wherein the solution contains between about 12% and about 20% by weight solids.

4. The method of claim 3 wherein the solution contains about 18% by weight solids.

5. The method of claim 3 wherein the plastic ophthalmic lens is a multifocal lens.

6. The method of claim 5 wherein the plastic ophthalmic lens is a trifocal lens and the solution contains about 12% by weight solids.

7. The method of claim 1 wherein the pentaerythritol-based acrylates contains at least about 90% acrylates having at least triacrylate functionality.

8. The method of claim 1 wherein the viscosity reducing agent is polyethylene glycol diacrylate.

9. The method of claim 1 wherein the solvent is butanol.

10. The method of claim 1 wherein the photoinitiator includes 2-methyl-1-(4-(methyithio)phenyl)-2 morpholinopro-panone-1.

11. The method of claim 1 wherein the lens is rotated at a speed of between about 500 r.p.m. and about 1800 r.p.m. while the solution is applied to the surface of the lens.

12. The method of claim 11 wherein the lens is rotated at a speed of between about 700 r.p.m. and about 1200 r.p.m. while the solution is applied to the surface of the lens.

13. The method of claim 11 and further comprising: spinning the lens after applying the solution to the surface to spin off excess solution.

14. The method of claim 13 wherein spinning the lens is at a speed of between about 500 r.p.m. and about 1800 r.p.m. for about 1.5 seconds to about 30 seconds.

15. The method of claim 1 wherein the solution is applied at a flow rate of between about 40 cc/min and about 250 cc/min.

16. A method of coating a surface of a plastic ophthalmic lens, the method comprising:
    applying a washing fluid to the surface while the lens is spinning;
    continuing spinning of the lens after stopping application of the washing fluid to permit excess washing fluid to spin off the surface;
    applying a coating to the surface by:
      spinning the lens,
      applying a coating solution which includes pentaerythritol-based acrylates of at least triacrylate functionality, a photoinitiator which includes 2-methyl-1-[4-(methyithio)phenyl]-2 morpholinopro-panone-1, and has a UV response which tends to counteract oxygen inhibition of curing at an outer surface of the coating, and butanol to the surface while the lens is spinning;
      continuing spinning of the lens after stopping application of the coating solution to permit excess coating solution to spin off the surface;
    drying the coating on the surface by:
      spinning the lens; and
    exposing the coating to ultraviolet radiation to cause curing of the coating.

17. A method of coating a front surface plastic ophthalmic lens comprising:
    spinning the lens;
    applying to the front surface, a coating of a solution which includes:
    pentaerythritol-based acrylates having at least triacrylate functionality,
    a viscosity reducing agent which includes acrylates of less than triacrylate functionality,
    a wetting agent,
    a photoinitiator which includes 2-methyl-1-[4-(methyithio)phenyl]-2 morpholinopro-panone-1, and
    a solvent; and exposing the coating to UV radiation to cure the coating.

18. The method of claim 17 wherein the solution contains between about 10% and about 35% by weight solids.

19. The method of claim 18 wherein the solution contains between about 12% and about 20% by weight solids.

20. The method of claim 19 wherein the solution contains about 18% by weight solids.

21. The method of claim 19 wherein the plastic ophthalmic lens is a multifocal lens.

22. The method of claim 21 wherein the plastic ophthalmic lens is a trifocal lens and the solution contains about 12% by weight solids.

23. The method of claim 17 wherein the pentaerythritol-based acrylates contains at least about 90% acrylates having at least triacrylate functionality.

24. The method of claim 17 wherein the viscosity reducing agent is polyethylene glycol diacrylate.

25. The method of claim 17 wherein the solvent is butanol.

26. The method of claim 17 wherein the lens is rotated at a speed of between about 500 r.p.m. and about 1800 r.p.m. while the solution is applied to the surface of the lens.

27. The method of claim 26 wherein the lens is rotated at a speed of between about 700 r.p.m. and about 1200 r.p.m. while the solution is applied to the surface of the lens.

28. The method of claim 26 and further comprising:

spinning the lens after applying the solution to the surface to spin off excess solution.

29. The method of claim 28 wherein spinning the lens is at a speed of between about 500 r.p.m. and about 1800 r.p.m. for about 1.5 seconds to about 30 seconds.

30. The method of claim 29 and further comprising: infrared drying the coating while spinning the lens.

31. The method of claim 17 and further comprising: washing the surface of the lens while spinning the lens, prior to applying the coating.

32. The method of claim 17 wherein the solution is applied at a flow rate of between about 40 cc/min and about 250 cc/min.

33. A method of coating a front surface of a trifocal plastic ophthalmic lens comprising:
   spinning the lens;
   applying, at a flow rate of between about 40 cc/min and about 250 cc/min at a pressure of between about 2.25 psi and about 3.0 psi, to the front surface of the trifocal lens while the lens is spinning at a speed of between about 700 rpm and about 1200 rpm, a coating of a solution which contains between about 12% and about 20% by weight solids, the solution including:
      pentaerythritol-based acrylates containing at least about 90% acrylates having at least triacrylate functionality,
      a viscosity reducing agent which contains acrylates of less than triacrylate functionality,
      a wetting agent,
      a photoinitiator, and
      a solvent; and
   exposing the coating to UV radiation to cure the coating.

34. A method of coating a front surface of a multifocal plastic ophthalmic lens comprising:
   spinning the lens;
   applying, at a flow rate of between about 40 cc/min and about 250 cc/min at a pressure of between about 2.25 psi and about 3.0 psi, to the front surface of the multifocal lens while the lens is spinning at a speed between about 500 rpm and about 1800 rpm, a coating of a solution which contains between about 12% and about 20% by weight solids, the solution including:
      pentaerythritol-based acrylates containing at least about 90% acrylates having at least triacrylate functionality,
      a viscosity reducing agent which contains acrylates of less than triacrylate functionality,
      a wetting agent,
      a photoinitiator, and
      a solvent; and
   exposing the coating to UV radiation to cure the coating.

35. A method of coating a front surface of a plastic ophthalmic lens comprising:
   spinning the lens;
   applying by spin coating, to the front surface of the lens while the lens is spinning, a coating of a solution which includes:
      pentaerythritol-based acrylates having at least triacrylate functionality,
      a viscosity reducing agent which contains acrylates of less than triacrylate functionality,
      a wetting agent,
      a photoinitiator having a UV response which tends to counteract oxygen inhibition of curing at an outer surface of the coating, the photoinitiator being selected from the group consisting of (a) 2-methyl-1-(4(methyithio)phenyl)-2 morpholinopro-panone-1, and (b) mixtures containing 2-methyl-1-(4(methyithio)phenyl)-2 morpholinopro-panone-1, and
      a solvent; and
   exposing the coating to UV radiation in the presence of air to cure the coating so that the coating is essentially fully cured at its outer surface.

36. The method of claim 35 wherein the solution contains between about 10% and about 35% by weight solids, and wherein the pentaerythritol-based acrylates contains at least about 90% acrylates having at least triacrylate functionality.

37. A method of coating a front surface of a plastic ophthalmic lens comprising:
   spinning the lens;
   applying, to the front surface of the lens while the lens is spinning at a speed of between about 500 r.p.m. and about 1800 r.p.m., a coating of a solution which includes:
      pentaerythritol-based acrylates having at least triacrylate functionality,
      a viscosity reducing agent which contains acrylates of less than triacrylate functionality,
      a wetting agent,
      a photoinitiator having a UV response which tends to counteract oxygen inhibition of curing at an outer surface of the coating, and
      a solvent;
   spinning the lens after applying the coating to spin off excess solution;
   infrared drying the coating while spinning the lens; and
   exposing the coating to UV radiation in the presence of air to cure the coating so that the coating is essentially fully cured at its outer surface.

* * * * *

UNITED STATES PATENT AND TRADEMARK OFFICE
CERTIFICATE OF CORRECTION

PATENT NO. : 5,246,728

DATED : September 21, 1993

INVENTOR(S) : JORGE M. RODRIGUEZ

It is certified that error appears in the above-identified patent and that said Letters Patent is hereby corrected as shown below:

On the Title Page of the Patent, delete [75] Inventor: Jorge M. Rodriquez, Miami, Fla.

insert [75] Inventor: Jorge M. Rodriguez, Miami, Fla.

Signed and Sealed this

Fifth Day of April, 1994

Attest:

BRUCE LEHMAN

*Attesting Officer*       *Commissioner of Patents and Trademarks*